(12) United States Patent
Chatterjee et al.

(10) Patent No.: US 9,442,814 B2
(45) Date of Patent: *Sep. 13, 2016

(54) SYSTEMS AND METHODS FOR IMPROVED FAULT TOLERANCE IN RAID CONFIGURATIONS

(71) Applicant: American Megatrends, Inc., Norcross, GA (US)

(72) Inventors: Paresh Chatterjee, Fremont, CA (US); Srikumar Subramanian, Newark, CA (US); Raghavan Sowrirajan, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/615,727

(22) Filed: Feb. 6, 2015

(65) Prior Publication Data
US 2015/0154090 A1    Jun. 4, 2015

Related U.S. Application Data

(63) Continuation of application No. 13/449,552, filed on Apr. 18, 2012, now Pat. No. 8,954,670.

(60) Provisional application No. 61/476,718, filed on Apr. 18, 2011.

(51) Int. Cl.
*G06F 11/00*    (2006.01)
*G06F 11/07*    (2006.01)
(Continued)

(52) U.S. Cl.
CPC ....... *G06F 11/2056* (2013.01); *G06F 11/0727* (2013.01); *G06F 11/0784* (2013.01); *G06F 11/1076* (2013.01); *G06F 11/1092* (2013.01)

(58) Field of Classification Search
CPC ............... G06F 11/20; G06F 11/0706; G06F 11/1076; G06F 11/1092; G06F 11/2056; G06F 11/00; G06F 11/07; G06F 11/0703
USPC .................. 711/113, 114, E12.001; 714/6.24
See application file for complete search history.

(56) References Cited

U.S. PATENT DOCUMENTS

| | | | |
|---|---|---|---|
| 5,333,305 A | | 7/1994 | Neufeld |
| 5,913,927 A | * | 6/1999 | Nagaraj .............. G06F 11/1092 711/114 |

(Continued)

OTHER PUBLICATIONS

Klein, Roger, How to Manage Disk Media Errors, InfoStor, Jan. 1, 1998, retrieved from the internet on Apr. 22, 2014 from http://www.infostor. com/index/articles/display/55873/articles/infostor/volume-2/issue-1/news-analysis-trends/how-to-manage-disk-media-errors.html, 4 pages.

(Continued)

*Primary Examiner* — David X Yi
*Assistant Examiner* — Kamal Dewan
(74) *Attorney, Agent, or Firm* — Meunier Carlin & Curfman LLC (57) ABSTRACT

A RAID bad block module is added to a RAID controller. The bad block module intercepts bad block errors and marks them in a bad block table. When a bad block error is intercepted the bad block module logs the error and determines, based on the error and previously received errors logged in the table, whether the RAID controller can handle the error without failing the entire array. If so, the bad block module passes the error to the RAID controller. Else, the bad block module passes the error to an application or operating system where it is handled like any other disk error. Thus, instead of failing the entire array, the bad block errors are dealt with by the operating system.

20 Claims, 3 Drawing Sheets

(51) Int. Cl.
*G06F 11/20* (2006.01)
*G06F 11/10* (2006.01)

(56) References Cited

U.S. PATENT DOCUMENTS

| | | |
|---|---|---|
| 5,978,856 A | 11/1999 | Jones |
| 6,381,674 B2 | 4/2002 | DeKoning et al. |
| 6,493,804 B1 | 12/2002 | Soltis et al. |
| 6,745,284 B1 | 6/2004 | Lee et al. |
| 6,775,794 B1 | 8/2004 | Horst et al. |
| 6,976,124 B2 | 12/2005 | Morita et al. |
| 7,062,605 B2 | 6/2006 | Chatterjee et al. |
| 7,231,409 B1 | 6/2007 | Chen |
| 7,689,766 B1 | 3/2010 | Chatterjee et al. |
| 7,707,151 B1 | 4/2010 | Blumenau et al. |
| 7,721,146 B2 | 5/2010 | Polisetti et al. |
| 2002/0161972 A1 | 10/2002 | Talagala et al. |
| 2005/0050383 A1 | 3/2005 | Horn et al. |
| 2005/0229033 A1 | 10/2005 | Tanaka et al. |
| 2005/0246503 A1 | 11/2005 | Fair |
| 2005/0283655 A1 | 12/2005 | Ashmore |
| 2006/0136627 A1 | 6/2006 | Maity et al. |
| 2006/0149999 A1 | 7/2006 | Hung |
| 2007/0036055 A1 | 2/2007 | Ito |
| 2007/0174670 A1 | 7/2007 | Terry et al. |
| 2007/0174849 A1 | 7/2007 | Cheung et al. |
| 2007/0294570 A1* | 12/2007 | Polisetti .............. G06F 11/1076 714/6.13 |
| 2008/0155220 A1 | 6/2008 | Edwards |
| 2009/0172273 A1 | 7/2009 | Piszczek et al. |
| 2010/0037091 A1 | 2/2010 | Baderdinni et al. |
| 2010/0088579 A1* | 4/2010 | Hafner ................ G06F 11/1076 714/807 |
| 2010/0262762 A1* | 10/2010 | Borchers ............... G06F 3/0613 711/103 |
| 2011/0022889 A1 | 1/2011 | Suenaga |

OTHER PUBLICATIONS

Wu, Suzhen, et al., "JOR: A Journal-guided Reconstruction Optimization for RAID-Structured Storage Systems," 15th International Conference on Parallel and Distributed Systems, 2009, pp. 609-618.

* cited by examiner

SYSTEMS AND METHODS FOR IMPROVED FAULT TOLERANCE IN RAID CONFIGURATIONS

CROSS-REFERENCE TO RELATED APPLICATION

This application is a continuation of U.S. Utility application Ser. No. 13/449,552 filed Apr. 18, 2012, entitled "Systems and Methods for Improved Fault Tolerance in RAID Configurations," which claims the benefit of U.S. Provisional Patent Application No. 61/476,718, filed on Apr. 18, 2011, and entitled "Systems and Methods for Improved Fault Tolerance in RAID Configurations," all of which are hereby incorporated by reference in their entirety.

BACKGROUND

Currently in RAID configurations hard disk bad block management is provided through its special reserved area of the hard disk called GLIST. In a hard drive, if a write operation fails due to a medium error such as a bad block, the hard disk allocates an unused block from GLIST and the bad block location is remapped to the newly allocated location in GLIST. Once the unused GLIST blocks are exhausted, the hard disk cannot internally fix faulty blocks and has to pass the error to the RAID layer. When the RAID layer receives the error, it then fails the disk. If the RAID layer cannot recover using other hard disks of the array (depending on the RAID level used), it will fail the entire array.

With respect to a read operation failure, when such an error is received by the RAID layer from a hard disk, the RAID layer reads from other blocks in a same stripe to try and compute the failed block data. During this data computation, if the RAID layer encounters further read operation failures and there is no bad block management module in the RAID layer, then the RAID layer will fail the entire array.

There are many other scenarios where a RAID layer will fail an entire array, for example:
1) During a degraded state: If an entire hard disk is already failed, if another read error is received, the RAID layer may mark the whole array as failed.
2) During a rebuilding state: While the RAID layer is rebuilding the array, it computes missing block data from the existing blocks in the same stripe. If it encounters a read error from the existing blocks, it may mark the whole array as failed.
3) During a dirty degraded state: Dirty degraded is a failure state that happens when there was an unclean shutdown while one or more stripes were open.
4) During an initialization state: During initialization, if there are any read errors, the RAID layer may mark the whole array as failed.

SUMMARY

A RAID bad block module is added to a RAID controller. The bad block module intercepts bad block errors and marks them in a bad block table. When a bad block error is intercepted the bad block module logs the error and determines, based on the error and previously received errors logged in the table, whether the RAID controller can handle the error without failing the entire array. If so, the bad block module passes the error to the RAID controller. Else, the bad block module passes the error to an application or operating system where it is handled like any other disk error. Thus, instead of failing the entire array, the bad block errors are dealt with by the operating system.

The bad block module may be a software module and may be added to an RAID controller that does not already have bad block management support. The bad block module may include a device driver layer called the thin disk layer that sits between a RAID stack of the software RAID controller and a disk subsystem, and another device driver layer called a thin RAID layer that sits between the operating system/application layer and the RAID stack.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing improved bad block handling in a RAID environment.

Figure 1:
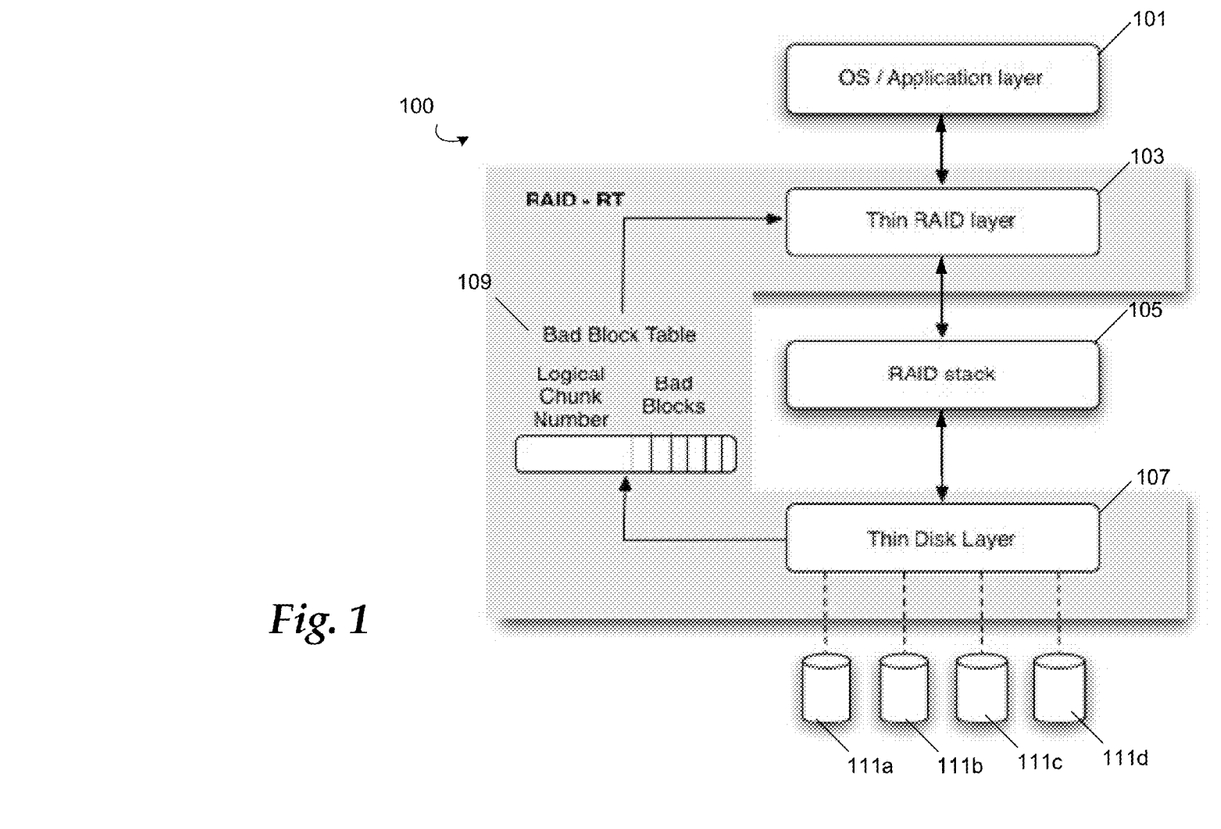
FIG. 1 is a diagram of an illustrative bad block module.

Turning now to FIG. 1, details will be provided regarding what is referred to herein as a bad block module 100. As shown the module 100 may include a thin RAID layer 103, a thin disk layer 107, and a bad block table 109. The module 100 may be a software module and may be designed to operate with a software RAID controller. For example, the module 100 may be implemented as a plug-in to existing software RAID controllers. In particular, the module 100 may act as multiple intermediate layers between an operating system/application layer 101, a RAID stack 105, and a plurality of volumes 111a, 111b, 111c, and 111d. In some implementations, each of the volumes 111a-111d may be one or more physical hard disk drives. However, other types of volumes may be supported such as network, virtual, and logical volumes. The volumes 111a-111d may form a RAID array that is managed by the RAID stack 105. The RAID may be a variety of RAID types including, but not limited to, RAID-0, 1, 2, 3, 4, 5, 6 etc. Moreover, more or fewer volumes 111a-111d may be supported.

The module 100 helps solve many of the problems described above with respect to array failure by intercepting medium errors such as bad block errors from the array, and instead of failing the array, it passes the error to the operating system/application layer 101. Thus, instead of making the whole array as failed which impose a big penalty for high availability, the module 100 only marks the relevant blocks as bad and deals that block as a bad block in the eyes of the operating system/application layer 101 that has issued the I/O to the array.

In some implementations, the bad block table 109 may include an entry for each chunk from the logical array (i.e., volumes 111a-111d), and an array of bitmaps with each bit of the bitmap representing each sector of a chunk. Other data structures may also be used. For a 64 KB RAID chunk size, 128 bits may be used to address all the sectors inside a chunk. Each bit in the bitmap associated with a chunk represents whether the corresponding sector in the chunk has been reported by any of the volumes 111a-111d as a bad block. The bad block table 109 may be stored in an area associated with the module 100 on one or more of the volumes 111a-111d. This area may be referred to herein as the "RAID-RT DDF" area.

In some implementations, the entries in the bad block table 109 may be hashed using the logical chunk number associated with each entry as a key. Further, when any changes are made to the bad block table 109 they may be persisted among one or more copies of the bad block table 109 in the RAID-RT DDF area, thus providing the same amount of fault tolerance as the corresponding RAID level of the array provides. Because each entry in the bad block table 109 is maintained for each chunk of the array by number, it is not affected when the array is expanded in the future. For example, additional entries may be added to the bad block table 109 to correspond to each chunk of any newly added disk space.

In some implementations, the thin disk layer 107 may intercept disk errors generated by the volumes 111a-111d before they reach the RAID stack 105. Instead, the thin disk layer 107 may generate and pass manipulated return codes to the RAID stack 105 depending on the disk errors that are received. Only I/O errors that can be gracefully handled by the RAID (i.e., without failing the array) are passed to the RAID stack 105. All other disk I/O errors received by the thin disk layer 107 are not passed to the RAID stack 105 otherwise the array would fail.

Instead of passing on the disk I/O errors that cannot be handled by the RAID stack 105, the errors are marked on the bad block table 109 by the thin disk layer 107. Further, while the errors are not passed to the RAID stack 105, the errors may still be passed to the operating system/application layer 101. In some implementations, the errors may be passed by the thin RAID layer 103 which is located between the RAID stack 105 and the operating system/application layer 101.

In some implementations, the thin RAID layer 103 may intercept I/O from the RAID stack 105, and before passing the I/O to the operating system/application layer 101, the thin RAID layer 103 may check the bad block table 109 for any errors associated with the chunks corresponding to the I/O that were logged by the thin disk layer 107. For example, if the I/O is a read operation and there is an error set in the bad block table 109 by the thin disk layer 107 corresponding to the chunks associated with the I/O, the thin RAID layer 103 may pass an error to the operating system/application layer 101 rather than the I/O received from the RAID stack 105.

Where the I/O received from the RAID stack 105 is associated with a write operation, the thin RAID layer 103 may clear any entry in the bad block table 109 for the chunk(s) associated with the write operation. The received write I/O may then be passed to the operating system/application layer 101. Thus, the bad block table 109 is built by the thin disk layer 107 and is referred to by the thin RAID layer 103.

Figure 2:
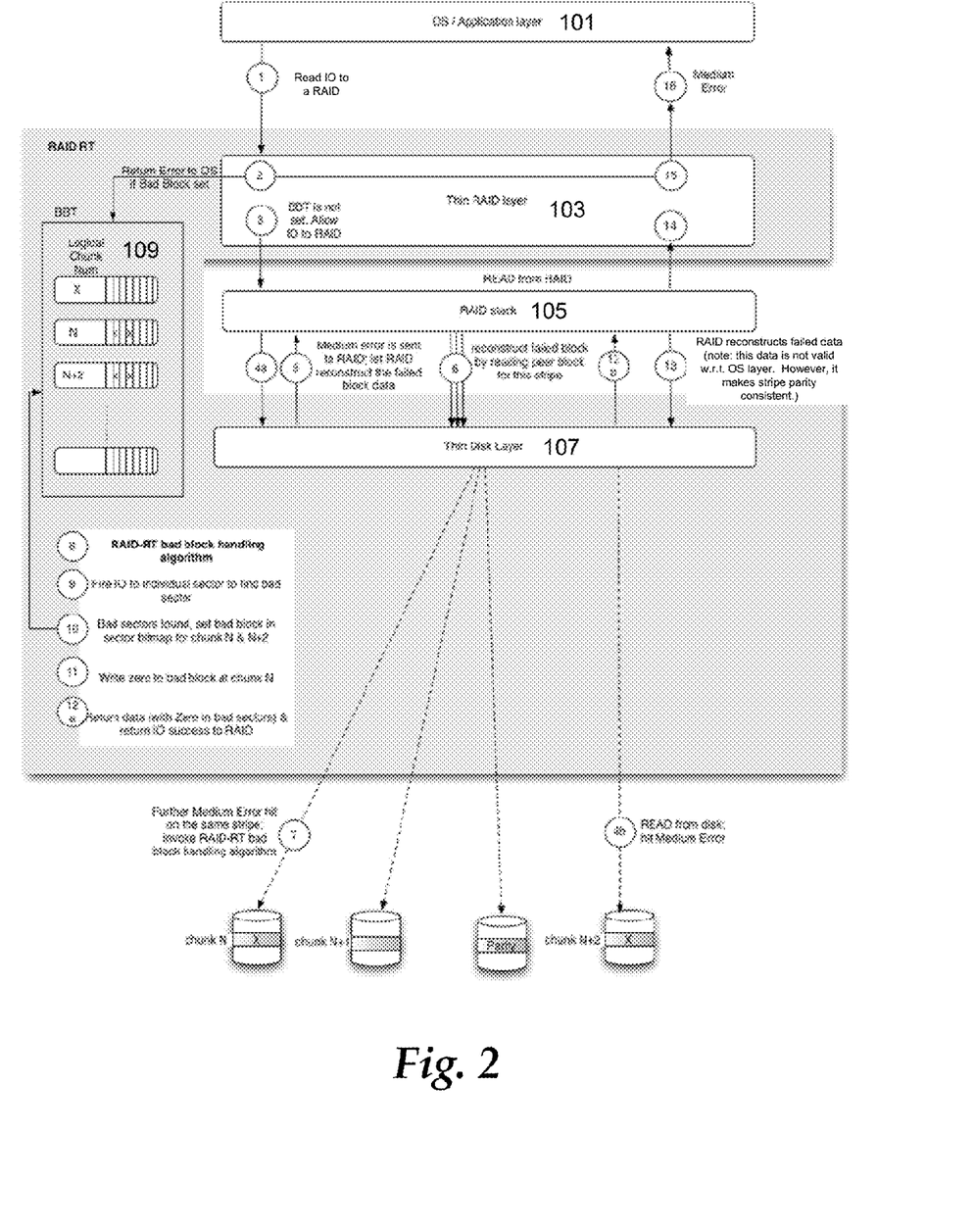
FIG. 2 is a flow diagram showing an illustrative routine for recovering from two or more medium errors.

FIG. 2 shows a diagram of an operational flow used by the module 100 to recover from multiple medium errors. At operation 1, a read I/O is received at the thin RAID layer 103 from the operating system/application layer 101. The read I/O may be associated with the chunk N+2 from the volumes 111a-111d. For example, the read I/O may be a request to read data from one or more sectors of the chunk N+2.

At operation 2, a determination is made by the thin RAID layer 103 as to whether there are any entries in the bad block table 109 for the chunk N+2 associated with the read I/O that would indicate that a bad block error was reported for one of the sectors of the chunk N+2. If so, at operation 15, the thin RAID layer 103 may generate an error, and may provide the error to the operating system/application layer 101 at operation 16. Else, the read I/O is passed to the RAID stack 105 at operation 3.

At operation 4a, the read I/O is intercepted by the thin disk layer 107. At operation 4b, the read I/O is passed to the volumes 111a-111d and a medium error such as a bad block error is generated by the volumes 111a-111d and intercepted by the thin disk layer 107. In some implementations, the thin disk layer 107 may log the bad block error by setting the entry for the chunk N+2 in the bad block table 109.

At operation 5, the bad block error is passed to the RAID stack 105 by the thin disk layer 107. Because the bad block error is the first bad block error received for the stripe associated with the chunk N+2, the RAID stack 105 may be able to reconstruct the failed block associated with the chunk N+2. At operation 6, the RAID stack 105 may begin to reconstruct the failed block.

At operation 7, an additional bad block error is received by the thin disk layer 107 for a read I/O associated with the chunk N. The chunk N may be part of the same stripe as the chunk N+2. Because the RAID stack 105 may not be able to reconstruct an additional bad block on the stripe, to avoid a failed array the thin disk layer 107 may initiate a bad block handling algorithm at operation 8.

At operation 9, as part of the bad block handling algorithm, the thin disk layer 107 may determine the bad sectors for the chunks N and N+2 associated with the bad block errors. In some implementations, the thin disk layer 107 may determine the bad sectors by generating read I/Os to each of the sectors associated with the chunks N and N+2. At operation 10, the thin disk layer 107 may mark the entries in the bad block table 109 corresponding to the chunks N and N+2 and may set the corresponding bitmap entries corresponding to the determined bad sectors.

At operation 11, as part of the bad block handling algorithm, the thin disk layer 107 may write a dummy value such as zero to the bad sectors associated with the chunk N. At operation 12a, as part of the bad block handling algorithm, the thin disk layer 107 may return I/O to the RAID stack 105 indicating that the read I/O for the chunk N was successful (even though it was not). The I/O may include the dummy values written to the bad sectors of the chunk N. At operation 12b, the RAID stack 105 may receive the I/O.

At operation 13, the RAID stack 105 may begin to reconstruct the data associated with the chunk N+2 using the data associated with stripe. However, since the dummy data was written to the bad sectors of the chunk N, the values in the chunks N and N+2 are no longer valid with respect to the operating system/application layer 101. Therefore, the entries for the chunks N and N+2 may remain marked in the bad block table 109 until a write I/O is received from the operating system layer 101. Until the entries are removed, subsequent read I/Os from the operating system/application layer 101 may result in errors generated by the thin RAID layer 103, for example.

At operation 14, the thin RAID layer 103 may intercept the I/O with the dummy values from the RAID stack 105. At operation 15, the thin RAID layer 103 may check the bad block table 109 and may determine that the entries associated with the I/O are unreliable. Accordingly, at operation 16, the thin RAID layer 103 may generate an error to the operating system/application layer 101.

Following are descriptions of how the module 100 described herein may be used to avoid total array failure for the RAID states described in the background section such as an optimal state, a degraded state, a rebuilding state, and a dirty degraded state. In addition, how the module 100 may be used to provide increased performance for array replication is also described.

With respect to the optimal state, a first medium error such as a bad block error may be received by the thin disk layer 107 from the array for a read I/O. Because the array is in the optimal state, the medium error is provided to the RAID stack 105 where error may be recovered from. However, a next and consecutive medium error for a read I/O indicating bad sectors for the same stripe received by the thin disk layer 107 is not provided to the RAID stack 105. Instead, the thin disk layer 107 initiates the RAID-RT bad block handling algorithm described above and passes a message to RAID stack 105 indicating that the read I/O was successful and returns zero data for the bad sectors. The RAID stack 105 may then use the zero data to reconstruct the failed disk of the first received medium error and makes the stripe associated with the bad blocks parity consistent. The thin RAID layer 103 then receives I/O from RAID stack 105 indicating that the read I/O was completed. The thin RAID layer 103 may then check the bad block table 109 to see if there are any bad blocks associated with the I/O, and if so, the thin RAID layer 103 may provide an error to the operating system/application layer 101 instead of the I/O received from the RAID stack 105.

With respect to the degraded state, one disk of the array has already failed. Here the RAID stack 105 cannot reconstruct the array if another error is received during a read I/O. During the degraded state, the module 100 may treat the failed disk as a first medium error such as a bad block error. Upon receiving a read I/O, any subsequent medium error generated by the volumes 111a-111d and received by the thin disk layer 107 is handled as described above with respect to the optimal state.

With respect to the rebuilding state, the disk being rebuilt may be treated similarly to the failed disk described above with respect to the degraded state. Accordingly, any subsequently received errors from the volumes 111a-111d by the thin disk layer 107 may be handled as described above and not passed to the RAID stack 105.

With respect to the dirty degraded state, all open or unfinished I/Os that resulted from the unclean shut down may be marked in the bad block table 109. For example, the chunks associated with each I/O may be marked in the bad block table 109. Any subsequently received errors from the volumes 111a-111d by the thin disk layer 107 may be handled by the module 100 as described above and not passed to the RAID stack 105.

With respect to array replication, a primary array may be replicated to a secondary array. If there is a medium error associated with the primary array, the same medium error has to be marked in the secondary array. Accordingly, a replication module may interact with the thin RAID layer 107 of the module 100 to replicate any entries made to the bad block table 109 associated with the primary array to a bad block table 109 associated with the secondary array. Such an arrangement may be used for asynchronous replications, for example for re-syncing the secondary array with the primary array if the secondary array comes up after being offline. Such an arrangement may also be used for synchronous replications, for example for re-syncing either of the arrays after an array comes up after going offline.

With respect to the file system and storage OS usage of the RAID array, the OS or the file system may due to deletion of files, snapshots or volumes mark written areas in the RAID array as free. These areas would then be used for newly created volume/snapshot/file data. Accordingly, the file system or the storage OS may interact with the thin RAID layer 103, to inform of the freed areas, and the thin RAID layer 103 can clear any bad blocks marked on these areas. This will eliminate unnecessary memory required for handling bad blocks.

Figure 3:
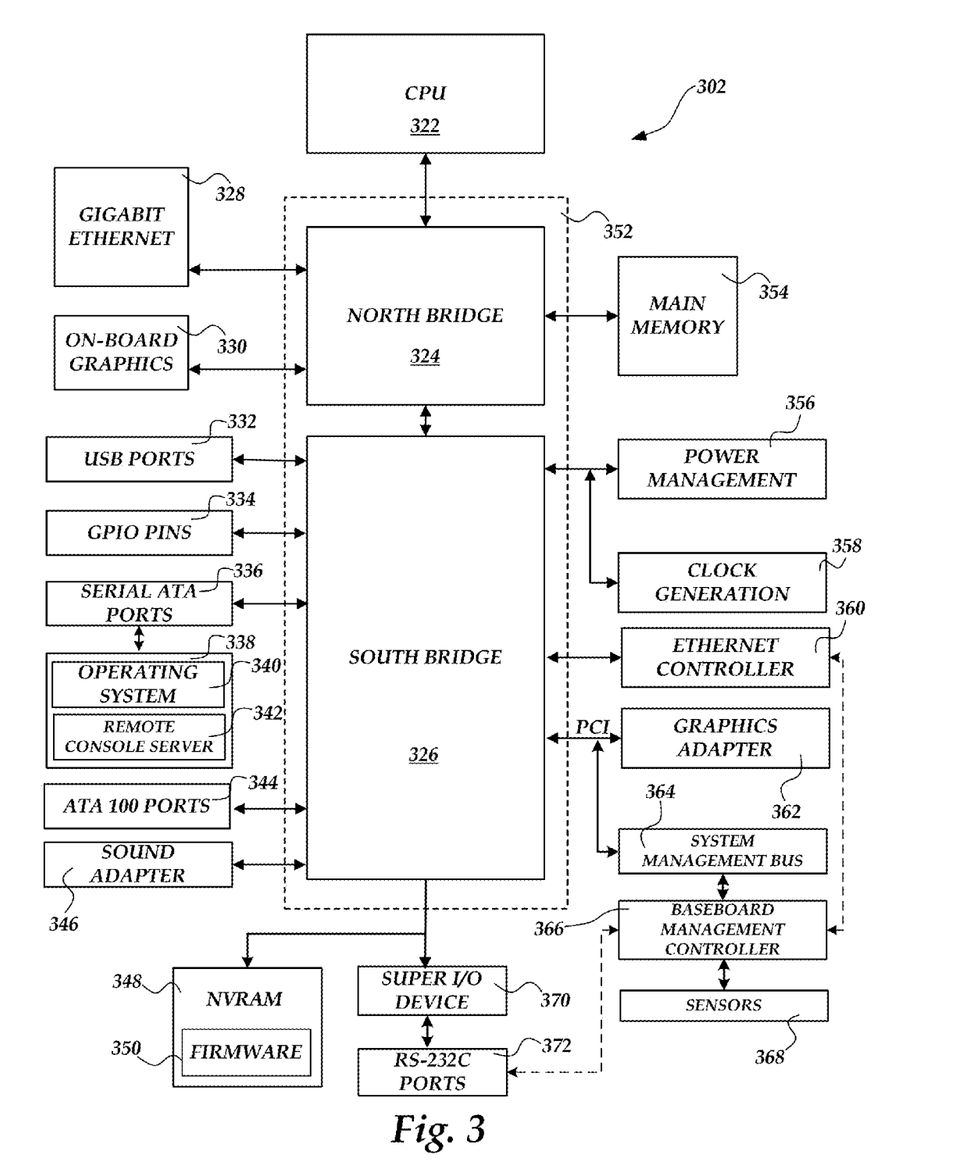
FIG. 3 is a computer architecture diagram showing an illustrative computer hardware architecture for a storage node computing system capable of implementing aspects of the embodiments presented herein.

FIG. 3 shows an illustrative computer architecture for a computer 300 capable of executing the software components described herein for implementing network RAID in a virtual storage chunk. In particular, the computer architecture shown in FIG. 3 provides a simplified view of the architecture of a conventional server computer 302 and may be utilized to implement the storage nodes 2.

FIG. 3 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The server computer 302 includes a baseboard, or "motherboard", which is a printed circuit board to which a multitude of components or devices may be connected by way of a system bus or other electrical communication path.

In one illustrative embodiment, a CPU 322 operates in conjunction with a chipset 352. The CPU 322 is a standard central processor that performs arithmetic and logical operations necessary for the operation of the computer. The server computer 302 may include a multitude of CPUs 322.

The chipset 352 includes a north bridge 324 and a south bridge 326. The north bridge 324 provides an interface between the CPU 322 and the remainder of the computer 302. The north bridge 324 also provides an interface to a random access memory ("RAM") used as the main memory 354 in the computer 302 and, possibly, to an on-board graphics adapter 330. The north bridge 324 may also include functionality for providing networking functionality through a gigabit Ethernet adapter 328. The gigabit Ethernet adapter 328 is capable of connecting the computer 302 to another computer via a network. Connections which may be made by the network adapter 328 may include LAN or WAN connections. LAN and WAN networking environments are commonplace in offices, enterprise-wide computer networks, intranets, and the internet. The north bridge 324 is connected to the south bridge 326.

The south bridge 326 is responsible for controlling many of the input/output functions of the computer 302. In particular, the south bridge 326 may provide one or more universal serial bus ("USB") ports 332, a sound adapter 346, an Ethernet controller 360, and one or more general purpose input/output ("GPIO") pins 334. The south bridge 326 may also provide a bus for interfacing peripheral card devices such as a graphics adapter 362. In one embodiment, the bus comprises a peripheral component interconnect ("PCI") bus. The south bridge 326 may also provide a system management bus 364 for use in managing the various components of the computer 302. Additional details regarding the operation of the system management bus 364 and its connected components are provided below.

The south bridge 326 is also operative to provide one or more interfaces for connecting mass storage devices to the computer 302. For instance, according to an embodiment, the south bridge 326 includes a serial advanced technology attachment ("SATA") adapter for providing one or more serial ATA ports 336 and an ATA 100 adapter for providing one or more ATA 100 ports 344. The serial ATA ports 336 and the ATA 100 ports 344 may be, in turn, connected to one or more mass storage devices storing an operating system 340 and application programs, such as the SATA disk drive 338. As known to those skilled in the art, an operating system 340 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 340 comprises the LINUX operating system. According to another embodiment of the invention the operating system 340 comprises the WINDOWS SERVER operating system from MICROSOFT CORPORATION. According to another embodiment, the operating system 340 comprises the UNIX or SOLARIS operating system. It should be appreciated that other operating systems may also be utilized.

The mass storage devices connected to the south bridge 326, and their associated computer-readable media, provide non-volatile storage for the computer 302. Although the description of computer-readable media contained herein refers to a mass storage device, such as a hard disk or CD-ROM drive, it should be appreciated by those skilled in the art that computer-readable media can be any available media that can be accessed by the computer 302. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 326 for connecting a "Super I/O" device 370. The Super I/O device 370 is responsible for providing a number of input/output ports, including a keyboard port, a mouse port, a serial interface 372, a parallel port, and other types of input/output ports. The LPC interface may also connect a computer storage media such as a ROM or a flash memory such as a NVRAM 348 for storing the firmware 350 that includes program code containing the basic routines that help to start up the computer 302 and to transfer information between elements within the computer 302.

As described briefly above, the south bridge 326 may include a system management bus 364. The system management bus 364 may include a BMC 366. In general, the BMC 366 is a microcontroller that monitors operation of the computer system 302. In a more specific embodiment, the BMC 366 monitors health-related aspects associated with the computer system 302, such as, but not limited to, the temperature of one or more components of the computer system 302, speed of rotational components (e.g., spindle motor, CPU Fan, etc.) within the system, the voltage across or applied to one or more components within the system 302, and the available or used capacity of memory devices within the system 302. To accomplish these monitoring functions, the BMC 366 is communicatively connected to one or more components by way of the management bus 364. In an embodiment, these components include sensor devices for measuring various operating and performance-related parameters within the computer system 302. The sensor devices may be either hardware or software based components configured or programmed to measure or detect one or more of the various operating and performance-related parameters. The BMC 366 functions as the master on the management bus 364 in most circumstances, but may also function as either a master or a slave in other circumstances. Each of the various components communicatively connected to the BMC 366 by way of the management bus 364 is addressed using a slave address. The management bus 364 is used by the BMC 366 to request and/or receive various operating and performance-related parameters from one or more components, which are also communicatively connected to the management bus 364.

It should be appreciated that the computer 302 may comprise other types of computing devices, including handheld computers, embedded computer systems, personal digital assistants, and other types of computing devices known to those skilled in the art. It is also contemplated that the computer 302 may not include all of the components shown in FIG. 3, may include other components that are not explicitly shown in FIG. 3, or may utilize an architecture completely different than that shown in FIG. 3.

Based on the foregoing, it should be appreciated that technologies for providing networked RAID in a virtualized storage chunk are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing fault tolerance for a RAID array, the array including a plurality of storage volumes managed by a RAID stack of a RAID controller, the method comprising:
    providing a thin RAID layer between the RAID stack and an operating system;
    providing a thin disk layer between the RAID stack and the RAID array, wherein the thin disk layer maintains a bad block table having entries corresponding to chunks of the RAID array, the bad block table being configured to store bad block errors in the entries for the corresponding chunks;
    intercepting, by the thin disk layer, a bad block error sent from the RAID array to the RAID stack before the bad block error reaches the RAID stack, the bad block error being generated by the RAID array in response to the RAID array processing a read I/O request;
    determining, by the thin disk layer, using the bad block table, whether the RAID stack can handle the bad block error without failing the RAID array; and
    upon determining that the RAID stack cannot handle the bad block error without failing the RAID array, communicating the bad block error from the thin RAID layer to the operating system rather than passing the bad block error to the RAID stack.

2. The method of claim 1, further comprising:
    upon determining that the RAID stack can handle the bad block error, communicating the bad block error to the RAID stack; and
    reconstructing, by the RAID stack, data associated with a first chunk of the RAID array.

3. The method of claim 1, further comprising logging, by the thin disk layer, the bad block error in an entry corresponding to the first chunk of the RAID array in the bad block table in response to receiving the bad block error.

4. The method of claim 1, wherein determining whether the RAID stack can handle the bad block error further comprises determining, by the thin disk layer, whether the bad block table includes a bad block error in an entry corresponding to a second chunk of the RAID array, the first and second chunks of the RAID array being part of a stripe.

5. The method of claim 4, wherein each chunk comprises a plurality of sectors, and wherein bypassing, by the thin RAID layer, the bad block error to the operating system further comprises:
    determining, by the thin disk layer, bad sectors for each of the first and second chunks of the RAID array;
    writing, by the thin disk layer, dummy data to the bad sectors of the second chunk of the RAID array;
    reconstructing data associated with the first chunk of the RAID array based on data associated with the stripe, the data associated with the stripe including the dummy data;
    determining, by the thin disk layer, whether the reconstructed data is unreliable using the bad block table; and
    upon determining that the reconstructed data is unreliable, communicating, by the thin RAID layer, the bad block error to the operating system.

6. The method of claim 5, wherein each of the entries of the bad block table includes a bitmap having bits corresponding to the plurality of sectors of each chunk, the method further comprising marking, by the thin disk layer, bits corresponding to the bad sectors of the first and second chunks of the RAID array as bad blocks.

7. The method of claim 6, further comprising:
    receiving, by the thin RAID layer, a write I/O request associated with the first or second chunk of the RAID array from the operating system; and
    clearing, by the thin disk layer, the bits marked as bad blocks in the first or second chunk of the RAID array, respectively.

8. A non-transitory computer-readable recording medium having computer-executable instructions stored thereon for providing fault tolerance for a RAID array including a plurality of storage volumes managed by a RAID stack of a RAID controller that, when executed by a RAID controller, cause the RAID controller to:
    provide a thin RAID layer between the RAID stack and an operating system;
    provide a thin disk layer between the RAID stack and the RAID array, wherein the thin disk layer maintains a bad block table having entries corresponding to chunks of the RAID array, the bad block table being configured to store bad block errors in the entries for the corresponding chunks;
    cause the thin disk layer to intercept a bad block error sent from the RAID array to the RAID stack before the error reaches the RAID stack, the bad block error being generated by the RAID array in response to the RAID array processing a read I/O request;
    cause the thin disk layer to determine using the bad block table, whether the RAID stack can handle the bad block error without failing the RAID array; and
    upon determining that the RAID stack cannot handle the bad block error without failing the RAID array cause the thin RAID layer to communicate the bad block error to the operating system rather than passing the bad block error to the RAID stack.

9. The non-transitory computer-readable recording medium of claim 8, having further computer-executable instructions stored thereon that, when executed by the RAID controller, cause the RAID controller to cause the RAID stack to reconstruct data associated with a first chunk of the RAID array upon determining that the RAID stack can handle the bad block error.

10. The non-transitory computer-readable recording medium of claim 8, having further computer-executable instructions stored thereon that, when executed by the RAID controller, cause the RAID controller cause the thin disk layer to log the bad block error in an entry corresponding to the first chunk of the RAID array in the bad block table in response to receiving the bad block error.

11. The non-transitory computer-readable recording medium of claim 8, having further computer-executable instructions stored thereon that, when executed by the RAID controller, cause the RAID controller to cause the thin disk layer to determine whether the RAID stack can handle the bad block error by determining whether the bad block table includes a bad block error in an entry corresponding to a second chunk of the RAID array, the first and second chunks of the RAID array being part of a stripe.

12. The non-transitory computer-readable recording medium of claim 11, wherein each chunk comprises a plurality of sectors, and having further computer-executable instructions stored thereon that, when executed by the RAID controller, cause the RAID controller to:
   cause the thin disk layer to determine bad sectors for each of the first and second chunks of the RAID array;
   cause the thin disk layer to write dummy data to the bad sectors of the second chunk of the RAID array;
   cause the RAID stack to reconstruct data associated with the first chunk of the RAID array based on data associated with the stripe, the data associated with the stripe including the dummy data;
   cause the thin disk layer to determine whether the reconstructed data is unreliable using the bad block table; and
   upon determining that the reconstructed data is unreliable, causing the thin RAID layer to communicate the bad block error to the operating system.

13. The non-transitory computer-readable recording medium of claim 12, wherein each of the entries of the bad block table includes a bitmap having bits corresponding to the plurality of sectors of each chunk, and having further computer-executable instructions stored thereon that, when executed by the RAID controller, cause the RAID controller to cause the thin disk layer to mark bits corresponding to the bad sectors of the first and second chunks of the RAID array as bad blocks.

14. The non-transitory computer-readable recording medium of claim 13, having further computer-executable instructions stored thereon that, when executed by the RAID controller, cause the RAID controller to:
   cause the thin RAID layer to receive a write I/O request associated with the first or second chunk of the RAID array from the operating system; and
   cause the thin disk layer to clear the bits marked as bad blocks in the first or second chunk of the RAID array, respectively.

15. A RAID controller for providing fault tolerance for a RAID array, comprising:
   a processing unit;
   a memory in communication with the processing unit;
   a RAID stack that manages a RAID array comprising a plurality of storage volumes;
   a thin RAID layer between the RAID stack and an operating system; and
   a thin disk layer between the RAID stack and the RAID array, wherein the thin disk layer maintains a bad block table having entries corresponding to chunks of the RAID array, the bad block table being configured to store bad block errors in the entries for the corresponding chucks;
   wherein the thin disk layer:
      intercepts a bad block error sent from the RAID array to the RAID stack before the bad block error reaches the RAID stack, the bad block error being generated by the RAID array in response to the RAID array processing the read I/O request, and
      determines using the bad block table, whether the RAID stack can handle the bad block error without failing the RAID array;
   wherein the thin RAID layer communicates the bad block error to the operating system upon the determination that the RAID stack cannot handle the bad block error without failing the RAID array rather than passing the bad block error to the RAID stack from the thin disk layer.

16. The RAID controller of claim 15, wherein upon determining that the RAID stack can handle the bad block error, the thin disk layer communicates the bad block error to the RAID stack, and the RAID stack is further configured to reconstruct data associated with the first chunk of the RAID array.

17. The RAID controller of claim 15, wherein the thin disk layer is further configured to log the bad block error in an entry corresponding to the first chunk of the RAID array in the bad block table in response to receiving the bad block error.

18. The RAID controller of claim 15, wherein the thin disk layer is further configured to determine whether the RAID stack can handle the bad block error by determining whether the bad block table includes a bad block error in an entry corresponding to a second chunk of the RAID array, the first and second chunks of the RAID array being part of a stripe.

19. The RAID controller of claim 18, wherein each chunk comprises a plurality of sectors;
   wherein the thin disk layer is further configured to:
      determine bad sectors for each of the first and second chunks of the RAID array, and
      write dummy data to the bad sectors of the second chunk of the RAID array;
   wherein the RAID stack is further configured to reconstruct data associated with the first chunk of the RAID array based on data associated with the stripe, the data associated with the stripe including the dummy data; and
   wherein the thin RAID layer is further configured to:
      determine whether the reconstructed data is unreliable using the bad block table, and
      upon determining that the reconstructed data is unreliable, communicate the bad block error to the operating system.

20. The RAID controller of claim 19, wherein each of the entries of the bad block table includes a bitmap having bits corresponding to the plurality of sectors of each chunk, and the thin disk layer is further configured to mark bits corresponding to the bad sectors of the first and second chunks of the RAID array as bad blocks.

* * * * *